United States Patent [19]

Volkmann et al.

[11] Patent Number: 5,399,052
[45] Date of Patent: Mar. 21, 1995

[54] AEROSPACE FASTENER WITH IMPROVED BONDING RELATIONSHIP TO OTHER APPLICATIONS

[76] Inventors: Josef F. Volkmann, 57100 Volkmann Rd., Orange, Calif. 92539; Richard Ohlman, 24472 Ladera Dr., Mission Viejo, Calif. 92691

[21] Appl. No.: 80,509

[22] Filed: Jun. 24, 1993

Related U.S. Application Data

[63] Continuation-in-part of Ser. No. 43,934, Apr. 8, 1993.

[51] Int. Cl.⁶ .................... F16B 13/04; F16B 39/02
[52] U.S. Cl. ........................... 411/43; 411/82; 411/55; 411/930
[58] Field of Search ............ 411/43, 55, 82, 258, 411/301, 930

[56] References Cited

U.S. PATENT DOCUMENTS

| | | | |
|---|---|---|---|
| 4,164,971 | 8/1979 | Strand | 411/301 |
| 4,285,378 | 8/1981 | Wallace | 411/258 |
| 4,778,318 | 10/1988 | Jeal | 411/43 |
| 4,832,548 | 5/1989 | Strobel | 411/43 X |
| 4,877,363 | 10/1989 | Williamson et al. | 411/43 |
| 4,950,115 | 8/1990 | Sadri | 411/43 X |
| 5,000,636 | 3/1991 | Wallace | 411/82 X |
| 5,152,648 | 10/1992 | Pratt | 411/55 X |

*Primary Examiner*—Neill R. Wilson
*Attorney, Agent, or Firm*—Plante & Strauss

[57] ABSTRACT

There is disclosed an aerospace fastener system in which a threaded bolt fastener is secured with a free spinning threaded nut or collar and in which the engagement of the threaded members is fixedly secured by an adhesive. The length of the bolt fastener is preselected such that when the fastener is applied in a maximum grip condition, the end of the bolt fastener does not project beyond the top surface of the nut or collar, or is even slightly shorter than the length necessary to reach the top surface of the nut or collar. There is also disclosed a blind fastener system in which the adhesive is applied to the threads of the core screw of the blind fastener which are engaged upon installation of the fastener.

10 Claims, 4 Drawing Sheets

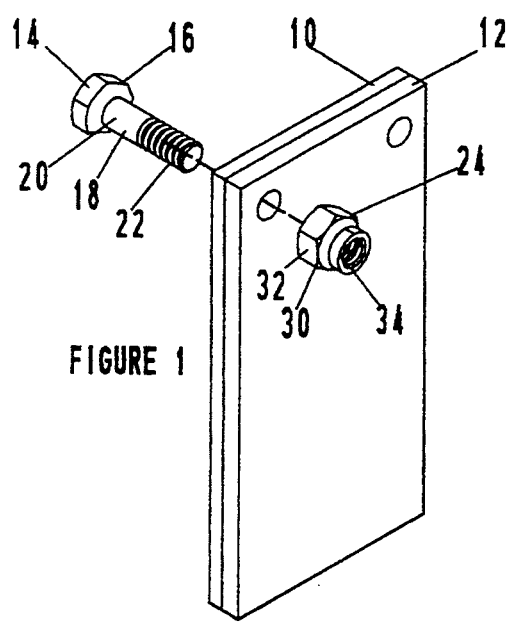
FIGURE 1
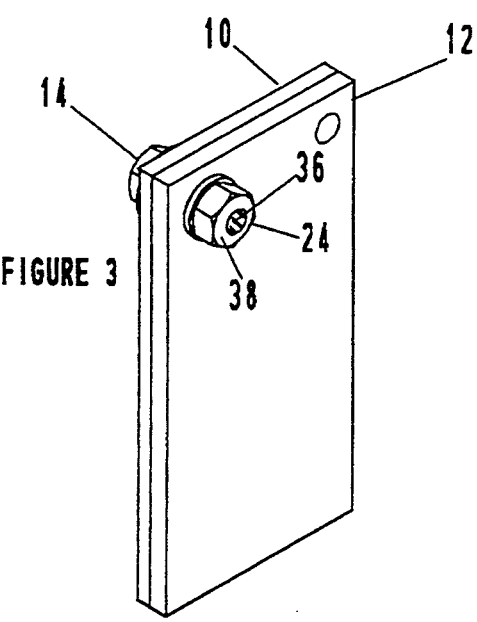
FIGURE 3
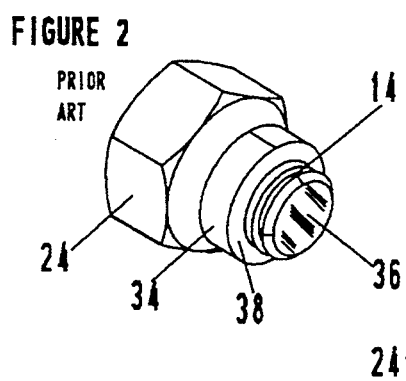
FIGURE 2
PRIOR ART
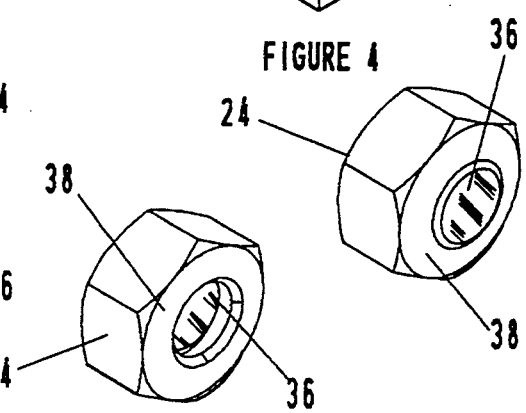
FIGURE 4
FIGURE 5

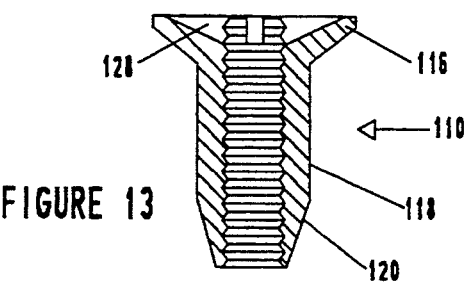
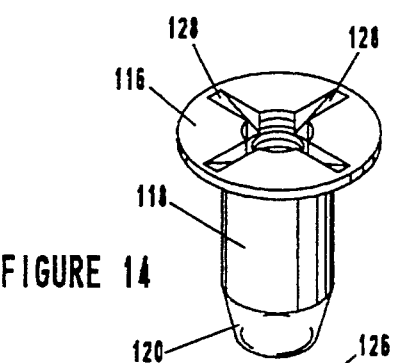
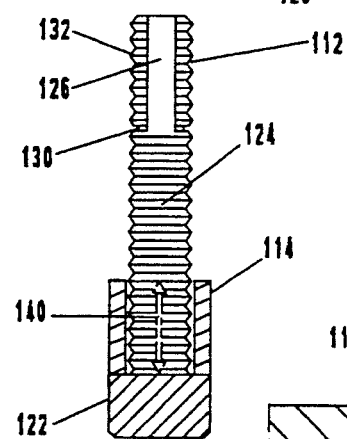
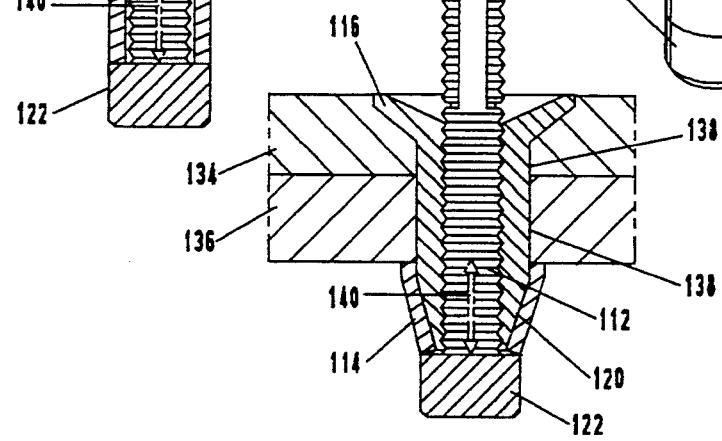

AEROSPACE FASTENER WITH IMPROVED BONDING RELATIONSHIP TO OTHER APPLICATIONS

This application is a continuation in part of our co-pending application Ser. No. 08/43,934, filed on Apr. 8, 1993.

FIELD OF INVENTION

This invention relates to aerospace fasteners, and in particular, to a bonding system which significantly reduces the weight of fasteners used in aerospace applications and provides free spinning capability, or the assurance of a double locking system.

BRIEF STATEMENT OF THE PRIOR ART

Various techniques have been used in the aerospace industry to ensure that threaded fasteners are secured with the requisite torque and that they stay secured during use. An example is the product known as the HI-LOK fastener in which a wrenching collar is attached to a fastener collar by a frangible section such that when the application torque exceeds the design torque for the fastener, the wrenching collar separates, leaving the fastening collar in place. Although this application technique insures that the fastener collars are initially applied at the requisite torque, there is no assurance that with use and vibration the fastener collars will not loosen.

Various techniques have been used to prevent loosing of the fastener collars or nuts in the aerospace industry. These have included mechanical locking devices such as mechanically upset threads on the nut or bolt fastener, typically slightly elliptical threads on the nut fastener. This, however, imparts a permanent drag to the application of the fastener and precludes free-spinning fasteners, thus encumbering the aircraft assembly. Additionally, the upset threads cause galling in the threads of the fasteners during application, particularly with titanium and certain stainless steel fasteners. Other mechanical locking devices include plastic or elastomer inserts in a portion of the threads of the nut or bolt fastener. Another disadvantage of the mechanical lock fasteners such as HI-LOK or HI-LITE, etc., is that they cannot be reused, contributing to high maintenance costs of the aircraft. There is also no simple technique in the conventional fastener systems to provide a double lock for additional security against loosening under vibration.

Non-mechanical locks which have been used are adhesives such as those commercially available from the Loktite Corporation. Various patents have been issued for adhesive compositions such as U.S. Pat. No. 4,164,971 to Strand for an adhesive coating having a micro-encapsulated solvent which, upon application of the fastener, is released to cure the adhesive coating on the bolt or nut. Another patent, U.S. Pat. No. 4,325,985 to Wallace discloses an uncured resin which is coated with a ultraviolet-degradable film and which is activated by ultraviolet radiation during the application process. Other patents relating to adhesive systems are U.S. Pat. No. 3,814,156 to Bachmann and U.S. Pat. No. 3,163,338 to Reike.

The design and application of threaded fasteners for commercial aircraft is closely regulated by the aerospace industry rules, such as paragraph 5 of the Boeing part specification for self-locking nuts (BPS-N-70) which specifies that a nut is considered installed when a minimum of one thread plus the chamfer of the male thread extends beyond the top of the nut. The purpose of this rule is two-fold; it permits easy visual inspection to confirm that the fastener has been applied correctly and it provides additional threaded length to assure that the mechanical locking element of the fastener has been penetrated by the bolt fastener.

Another innovation particularly useful for inspection has been the use of a coating containing a pigment, which is visible either under ordinary or ultraviolet illumination, on the threads of the bolt fastener, thereby providing a highly visible indication of the extending threads of the bolt fastener to confirm that the nut has been properly secured.

The requirement that the length of the bolt be sufficient to extend beyond the top of the nut appears to be a modest requirement. However, this requirement adds significantly to the overall dead weight of an aircraft. As an example, in a commercial aircraft, the Boeing 747, this requirement adds about 500 pounds dead weight to the aircraft. While this is not a major percentage of the overall aircraft weight, it is significant for if that added weight can be eliminated, the fuel or payload capacity of the aircraft can be increased by 500 pounds, which represents a very considerable saving in aircraft operation.

Applications are frequently encountered which permit installation from only one side, thus requiring the use of blind fasteners, and manufacturers supply useful fasteners under various designations such as the Beta-Lok of Hi-Shear Corporation, and Composi-Lok of Monogram Aerospace Fasteners. The essential elements are a high strength nut, a malleable sleeve and a high strength core screw having a break-off stem. These fasteners have previously relied on crimped locks for resistance to vibration loosening, and are thus suffer the disadvantages of tendency to galling, imprecise control on the clamping force and the lack of a double lock.

OBJECTIVES OF THE INVENTION

It is an objective of this invention to provide a fastener system for aerospace applications having improved bonding capability.

It is an additional objective of this invention to provide a locking fastener which does not utilize a mechanical lock and does not subject the fastener threads to galling upon application.

It is an added objective of this invention to provide a fastener which can be reused for several applications, thereby saving in maintenance costs and permitting retrofitting.

It is a further objective of this invention to provide a free spinning fastener for aerospace applications which utilizes an adhesive to prevent an unintentional loosening of the fastener.

It is a still further objective of this invention to provide a fastener system which is capable of providing a fluid tight seal.

It is yet another objective of this invention to provide a fastener system which can provide a double lock to resist loosening.

It is also an objective of this invention to provide a threaded free spinning fastener system for aerospace applications which does not add any unnecessary weight to the system.

It is likewise an objective of the invention to provide a free spinning fastener system for aerospace applications which can be readily inspected by visual observation to confirm proper installation.

It is an additional objective to provide a fastener system in which essentially all applied torque contributes to preloading of the fastener in axial tension thus giving precise control of preloading.

It is another objective of this invention to provide a locking system for blind fasteners which can be the only or second lock of the fastener.

It is yet another objective of this invention to provide a locking system which will permit use of free spinning blind fasteners which are free of galling tendencies and which provide precise clamping forces.

Other and related objectives will be apparent from the following description of the invention.

BRIEF DESCRIPTION OF THE INVENTION

This invention comprises an aerospace fastener system in which a threaded bolt fastener is secured with a free spinning threaded nut or collar and in which the engagement of the threaded members is fixedly secured by an adhesive. In this invention, the length of the bolt fastener is preselected such that when the fastener is properly applied on the work, the end of the bolt fastener does not project beyond the top surface of the nut or collar in a maximum grip condition. In this invention, the bolt fastener can even be slightly shorter than the length necessary to reach the top surface of the nut or collar when the fastener still meets the tensile load requirement of the specific application. Preferably the adhesive also includes an ultra-violet light fluorescent pigment so that upon ultra-violet illumination, the correct application of the fastener can be easily observed.

BRIEF DESCRIPTION OF THE FIGURES

The invention will be described with reference to the figures of which:

FIG. 1 illustrates the application of a threaded fastener in a typical aerospace application;

FIG. 2 illustrates the assembled fastener of the invention in an aerospace application;

FIG. 3 is an enlarged view of the nut end of the fastener system shown in FIG. 1;

FIG. 4 is an enlarged view of the fastener system in which the bolt fastener terminates within the nut fastener;

FIG. 5 illustrates the prior art requirement that the bolt extend beyond the top of the nut in a maximum grip condition for an aerospace application;

FIG. 13 is an sectional view of the parts of a blind fastener;

FIG. 14 is a perspective view of the blind fastener of FIG. 13; and

FIG. 15 is a sectional view of a blind fastener installation.

DESCRIPTION OF PREFERRED EMBODIMENT

Figure 6:
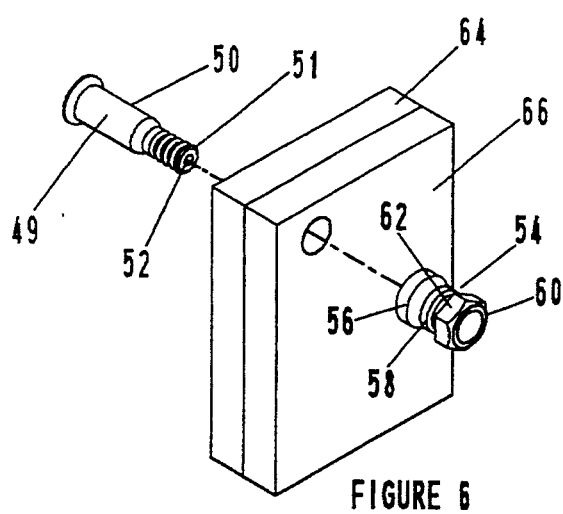
FIG. 6 illustrates the application of a frangible collar threaded fastener in a typical aerospace application.

Referring to FIG. 1, there is illustrated an application typical of aerospace applications in which two plate members 10 and 12 are to be secured together in a compressed relationship. The fastener system for use in this application comprises a threaded bolt fastener 14 having a head 16 with the appropriate wrenching flats, typically a hexagonally flatted head. The bolt fastener 14 has a shank 18 of an unthreaded portion 20 and a threaded end 22. The length of the fastener is sufficient to extend through the work pieces 10 and 12 and be received in the threaded nut fastener 24. The threaded nut fastener 24 has a wrenching section 30 which is provided with wrenching flats 32 of a hexagonal or other configuration. The nut fastener 24 also has an upstanding collar 34, which is used for the mechanical lock such as upset threads. The illustrated fastener system is typical of many used in aerospace applications. Although washers can be used in the assembly, the added weight of washers dictates against their use in most aerospace applications.

The current assembly in aerospace applications is governed by industry rules or specifications, such as the aforecited Boeing part specification. This assembly is illustrated in FIG. 2 where it can be seen that the bolt fastener 14 extends beyond the top 38 of the collar 24 by the requisite distance of at least one complete thread and the chamfer of the male (bolt) member. This specification applies to a maximum grip condition, which is the maximum total part thickness, i.e., the sum of the thicknesses of plate members 10 and 12, which can be secured with the fastener. There is a slight tolerance in total thickness of approximately 1/16 inch between the minimum total part thickness to the maximum part thickness. At minimum grip condition, the end of the bolt will, of course, extend even further beyond the top of the nut fastener.

Referring now to FIG. 3, the fastener system is shown in assembly in an application of this invention in which the end 36 the bolt fastener 14 is coterminous with the top 38 of the nut fastener 24 in a maximum grip condition. Also note that in this application, the upstanding collar 34 has been eliminated, as the mechanical lock is replaced with the adhesive lock of this invention. This assembly is shown with greater clarity by the enlarged view appearing as FIG. 4, in which the end 36 of the bolt 14 is flush with the top 38 of the nut 24.

As shown in FIG. 5, the invention also includes an application in which the bolt fastener 14 terminates approximately 1 to 2 complete threads short of the top 38 of the nut 24. This is shown as an alternative of the application of the invention shown in FIGS. 3 and 4, in which the end face 38 of the bolt fastener 14 is flush with the top 38 of the nut 24.

Referring now to FIG. 6, there is illustrated a typical application using a frangible wrenching collar. In the illustrated fastener, the head 49 of the bolt 50 is not provided with wrenching flats. Instead, the end 51 of the bolt fastener 50 has a hexagonal socket 52 to receive a key member (not shown) for immobilizing the bolt fastener during the application of the nut 54 in non-interference fit applications. This is necessary, as the prior art fastener systems with mechanical locks preclude free-spinning nuts, and the key member is necessary to restrain the bolt against the frictional resistance of the mechanical lock. One of the disadvantages of this prior art system, in addition to those previously mentioned, is that the frictional resistance is variable and results in a variable tension force in the fastener. The preload of the fastener system, which is the limiting torque which can be applied through the frangible collar, includes both the frictional resistance of the fastener and the tension force of the fastener. Since the frictional resistance is an uncontrolled variable, it results in an imprecisely controlled tension force on the fastener, affecting the fatigue life of the assembled structure.

The nut 54 has a locking collar 56 with internal threads, a reduced outer diameter neck 58 and a distal wrenching section 60 having wrenching flats 62, typically hexagonally flatted for conventional wrench sockets. The reduced diameter neck 58 is secured to the locking collar 56 by a web of reduced thickness selected for the application and fastener to provide a predetermined shear load which, when exceeded, will sever the locking collar 56 from the wrenching section 60.

Figure 7:
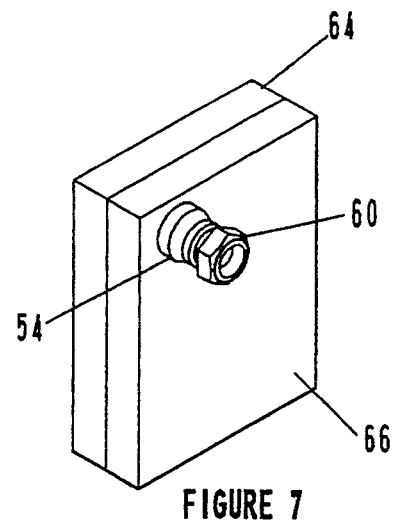
FIG. 7 illustrates the assembled frangible collar fastener before the wrenching collar is separated from the fastener.
Figure 8:
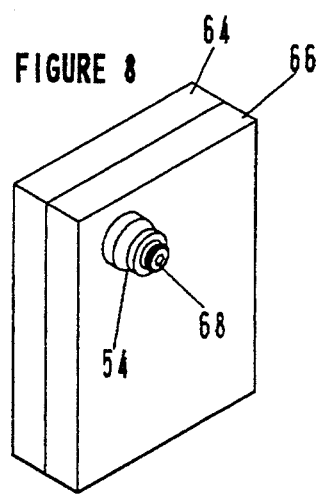
FIG. 8 illustrates the completed aerospace assembly typical of the prior art requirement that the bolt fastener extend beyond the top of the collar.
Figure 9:
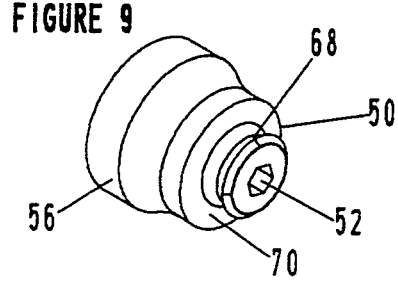
FIG. 9 is an enlarged view of the fastener collar and the end of the bolt fastener of FIG. 8.

As shown in FIG. 7, the fastener system is assembled to secure two work pieces 64 and 66, however, the wrenching section 60 has not been severed. In a typical application with a powered wrench, the locking collar is applied and tightened until the wrenching section 60 severs from the locking collar 56, leaving the installation as it is shown in FIG. 8. An enlarged view of the locking collar 56 and the extending end 68 of the bolt fastener 50 is shown in FIG. 9, where the end 68 of the bolt fastener 50 can be seen to extend 1 to 2 complete threads beyond the outer face 70 of the locking collar 56. This is in accordance with current industry regulations for aerospace applications.

Figure 10:
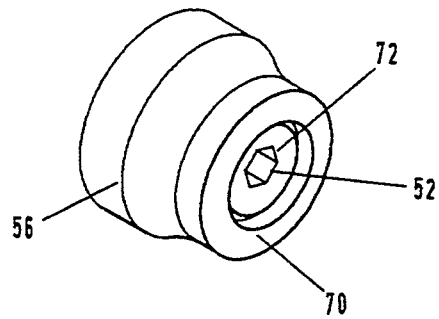
FIG. 10 is a view of the fastener collar in which the bolt fastener terminates within the collar.
Figure 11:
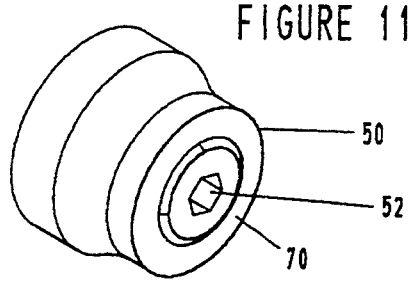
FIG. 11 is a view of the threaded fastener system in which the bolt is substantially the same length as the thickness of the work and nut fastener.

The invention, as applied to a maximum grip condition, is shown in FIGS. 10 and 11. In FIG. 10, the bolt fastener 72 terminates within the locking collar 56, approximately 1.5 to 2 complete threads from the top 70 of the locking collar 56. In FIG. 11, the bolt fastener 50 extends to the top 70 of the locking collar 56, but not beyond it, so that it terminates flush with the top 70 of the locking collar 56.

The adhesive coating which is used with the fasteners in this invention provides a sufficient holding torque to the nut fasteners to eliminate the excess length of the bolt fastener. The adhesive coating is commercially available as a water base anaerobic adhesive. Fully cured, it is a thermoset, acrylic polymer with very high compressive strength. An example of a commercially available product is available from Loctite Corporation of Birmingham, Mich. under the designation DRI-LOC. The adhesive is a dimethacrylate resin having a cure which reaches fixture in 10 minutes and a full cure in 72 hours. The adhesive system includes a catalyst which is encapsulated within micro-spheres to prevent curing of the adhesive material of the coating until the micro-spheres are ruptured by application of the nut onto the bolt fastener.

The adhesive coating of the adhesive with a micro-encapsulated curing agent is applied to the threads of either or both the bolt fastener and the nut fastener. Preferably the adhesive coating is applied completely (360°) about the threads and when the fastener system is assembled, and the nut is advanced on the bolt, the frictional engagement of the threaded surfaces of these members will rupture the micro-spheres, releasing the curing agent to set the adhesive and form an extremely tight engagement of the members.

Figure 12:
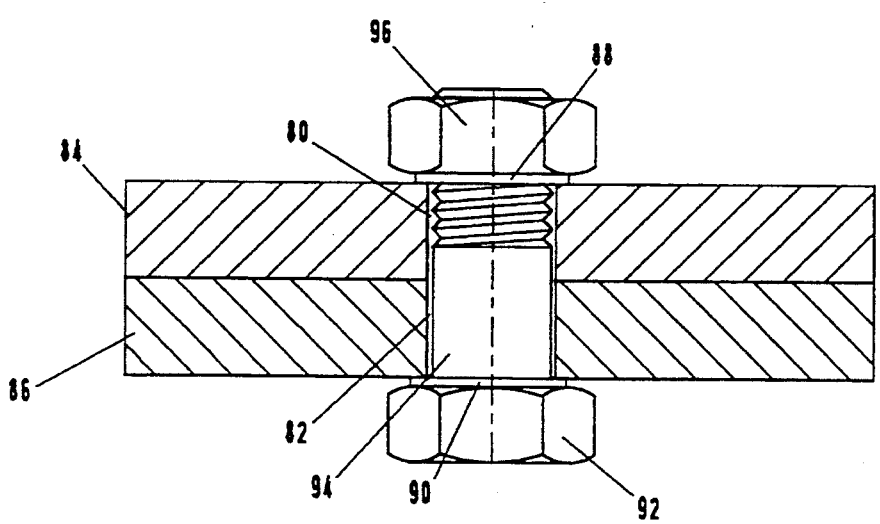
FIG. 12 illustrates an application of the invention to provide a fluid tight seal.

FIG. 12 illustrates an application requiring a fluid tight assembly about the apertures 80 and 82 in the assembled parts 84 and 86. In this application, the adhesive composition is also be applied as a coating 88 to the undersurface of the locking nut 96, and if desired, as a coating 90 on the underside of the head 92 of the bolt 94. For illustration purposes, the thicknesses of these coatings are shown out of scale. In practice, the thicknesses of the coatings would be much less; typically from 0.1 to 2 mils. In this application, the force required to apply the nut will be sufficient to crush the micro-spheres of the adhesive coatings 88 and 90, releasing the curing agent and bonding the undersurface of the nut 96 and the head 92 of the bolt 94 to the surfaces of the parts, thereby sealing the apertures 80 and 82 and contributing to a fluid tight assembly, free of leakage of gas or liquid.

As previously mentioned, the adhesive preferably contains a color or fluorescent pigment which is visible under ordinary light, or under ultra-violet light. Preferably ultra-violet fluorescent pigments are used so that the assembly can be inspected with ultra-violet light. Examples of fluorescent pigments or dyes are rhodamine or 4-aminoaphtyalimide dyes which can include phthalocanide pigments to obtain blue or green fluorescent colors. These pigments or dyes can be directly incorporated in the adhesive resin at concentrations sufficient to exhibit a pronounced fluorescence under ultra-violet illumination. The pattern which will be observed upon inspection will be a fluorescent ring or circle in applications such as illustrated in FIGS. 4 and 11, and a cylindrical ring in applications such as illustrated in FIGS. 5 and 10, because the coating adhesive is extruded on the end of the fastener.

The invention is also applicable to blind fasteners such as illustrated in FIGS. 12-15. The blind fasteners commonly have three parts; nut 110, core screw 112 and a malleable sleeve 114, sometimes referred to as the "blind head". The nut 110 can have a flush head 116, as illustrated, or can have a conventional hexagonal head. The nut 110 has a long internally threaded neck 118, which has a chamfered end 120. The core screw 112 has a head 122 and the sleeve 114 is received over the threaded end 124 of the core screw 112. The end 124 of the core screw has wrenching flats 126, and the head 116 of the nut 110 has torquing means such as the cross-slots 128 (see FIG. 14) which are engaged by bits of a driver.

The core screw 112 also has a weakened section, also known as a torque-off groove 130 at a preselected position along its length, thereby permitting the end 132 of the core screw 112 to shear off once the installation is completed.

FIG. 15 illustrates an installation prior to shearing of the end of the core screw. Work pieces 134 and 136 are bored with apertures 138 sufficiently large to receive the head 122 of the core screw 112 and sleeve 114. The nut 110 is advanced on the core screw 112 to engage its chamfered end 120 within the sleeve 114. The continued advance of the nut 110 expands the sleeve 114, forming a locking head. The nut 110 is advanced until it bottoms against the core screw head 122. Continued application of torque by the driver results in severing of the end 132 of the core screw 112 which breaks along the torque off groove 130.

This invention is applied to the blind fasteners by coating the threads which are unengaged prior to advance of the chamfered end of the neck of the nut. These threads 140 shown in FIG. 13 are within the sleeve and are coated with the adhesive. Any of the aerobic adhesives previously described can be used with the blind fasteners.

The blind fasteners are commonly provided with mechanical upsets, such as crimps, to provide a mechanical lock to insure against loosening during vibration. Such mechanical locks can be indentations 142 (see FIG. 14) in the neck 118 of the nut 110. This invention permits elimination of the mechanical locks, thereby providing a free-spinning blind fastener that is free of galling and imprecision in clamping force of the mechanically upset fasteners.

The chemical lock of this invention can be used in combination with the mechanical locks currently used with any of the aerospace fasteners to provide a double lock system, which can find some usefulness in highly sensitive applications.

One advantage of the locking system of the invention is that it can be used with metals which are subject to galling with the mechanical locks of the prior art, e.g., titanium and stainless steels, as well as metals more resistant to galling such as aluminum, mild steel and other steel alloys. Additionally, the invention can be used with fasteners which are now precluded from use such as fasteners formed of sintered metal or ceramic powders, cast ceramic fasteners, and fiber reinforced plastics, e.g., plastic resins such as polyimides, NYLON, etc., which are reinforced with glass, carbon, graphite fibers. With the adhesive system of the invention, fasteners formed of the aforementioned materials cannot be used with mechanical locks, as they cannot be permanently crimped.

The fasteners of this invention are free-spinning as they encounter no significant frictional resistance in the threads during installation so that all the applied torque preloads the fastener in axial tension.

Since the bonding of the adhesive coating on the threads of the fastener system is extremely strong, it is possible to avoid the excess length of the bolt fastener which is now required by the aerospace industry for non-adhesive systems, and in some applications to avoid the excessive thickness of the collar of the nut fastener which contains the mechanical lock because of the very secure and permanent bonding of the adhesive. This results in a very substantial weight saving when applied to assembly of a complete aircraft.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an aerospace fastener blind fastener system wherein a threaded core screw with a malleable sleeve is passed through an aperture and a nut having a chamfered neck is advanced into the sleeve to expand the sleeve into a locking head, the improvement comprising: an anaerobic adhesive forming an adhesive bond on the threads of said core screw surrounded by said sleeve and engaged by the end of said nut which is received within said sleeve to provide an adhesive lock of said nut to said core screw.

2. The fastener system of claim 1 being free of a mechanical lock whereby said nut is free-spinning on said core screw.

3. The fastener system of claim 1 wherein said core screw and nut are formed of titanium or stainless steel.

4. The fastener system of claim 1 wherein said adhesive is applied as a coating to the bottom surfaces of one or both of the sleeve and said nut to form an adhesive bond to its respective workpiece which seals against fluid passage.

5. The fastener system of claim 1 wherein said nut is formed of sintered metal or ceramic powders or fiber reinforced plastics.

6. An aerospace assembly of one or more work pieces having limited accessibility preventing access to opposite sides thereof, and including a blind fastener system comprising a threaded core screw which receives a malleable sleeve and a nut with an elongated neck which is received on said core screw with the neck thereof received within said sleeve to expand said sleeve and form a locking head, the improvement comprising; an aerobic adhesive forming an adhesive bond between the threads of said nut and said core screw coextensive with said sleeve.

7. The fastener system of claim 6 being free of a mechanical lock whereby said nut is free-spinning on said core screw.

8. The aerospace assembly of claim 6 wherein said core screw terminates at the top surface of said nut.

9. The aerospace assembly of claim 1 wherein said core screw and nut are formed of titanium or stainless steel.

10. The aerospace assembly of claim 1 wherein said adhesive is applied as a coating to the bottom surfaces of one or both of said sleeve and said nut to form an adhesive bond to its respective workpiece which seals against fluid passage.

* * * * *